L. J. VANDERMYDE.
INDICATING MEANS.
APPLICATION FILED JAN. 14, 1918.

1,293,991. Patented Feb. 11, 1919.

WITNESSES
James F. Crown,
H. H. Babcock.

INVENTOR
Louis J. Vandermyde,
BY Richard B. Owen,
ATTORNEY

UNITED STATES PATENT OFFICE.

LOUIS J. VANDERMYDE, OF MORRISON, ILLINOIS.

INDICATING MEANS.

1,293,991.

Specification of Letters Patent.

Patented Feb. 11, 1919.

Application filed January 14, 1918. Serial No. 211,884.

*To all whom it may concern:*

Be it known that I, LOUIS J. VANDERMYDE, a citizen of the United States, residing at Morrison, in the county of Whiteside and State of Illinois, have invented certain new and useful Improvements in Indicating Means, of which the following is a specification.

This invention relates to indicating means, and more particularly to means for indicating the amount of liquid within a tank or container.

One of the main objects of the invention is to provide an apparatus which is specially adapted for use in connection with gasolene tanks of automobiles for indicating the amount of fuel contained within the tank at any given time. A further object is to provide an apparatus in connection with an indicator or gage which may be so positioned as to be easily visible by the driver of the automobile. A still further object is to provide a device in which an electrically controlled gage or indicator is employed, this gage being connected to a source of supply of electrical energy and the current supplied to the indicator being varied in accordance with the level of the liquid within the tank thus causing the indicator, when connected to the source of supply of electrical energy, to designate the quantity of liquid within the tank. A further object is to provide an apparatus of the character stated of simple construction of few parts which may be readily applied to a tank of standard construction. Further objects will appear from the detailed description.

Figure 1:
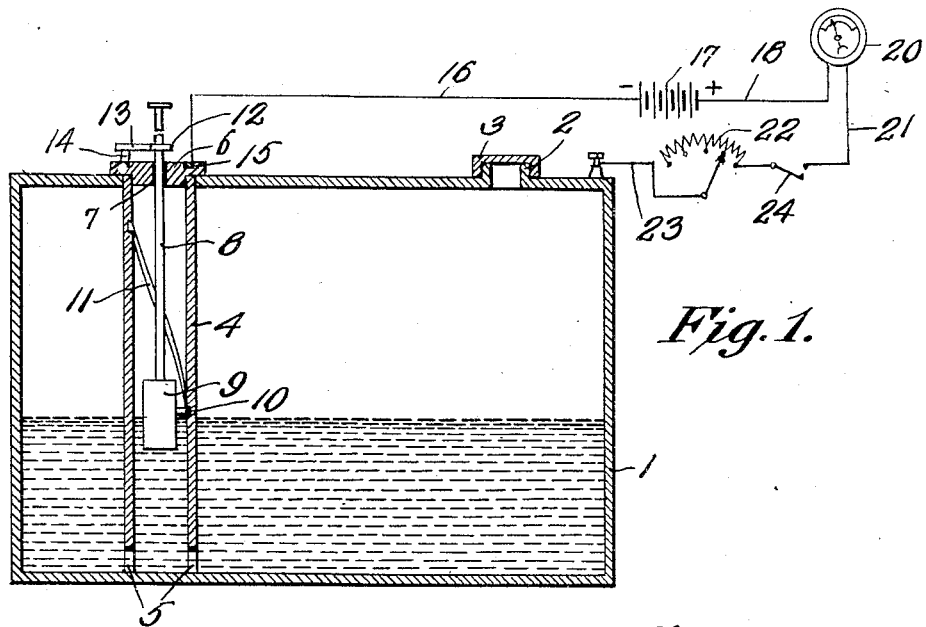
Figure 1 is a section through a tank showing an apparatus constructed in accordance with my invention applied thereto.
Figure 2:
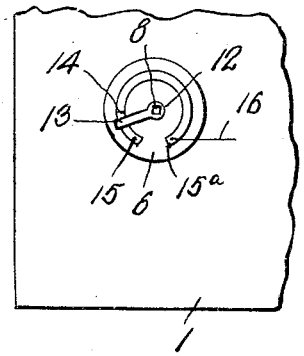
Fig. 2 is a fragmentary top plan view of the tank showing the resistance strip and the means for electrically connecting the same to the tank.
Figure 3:
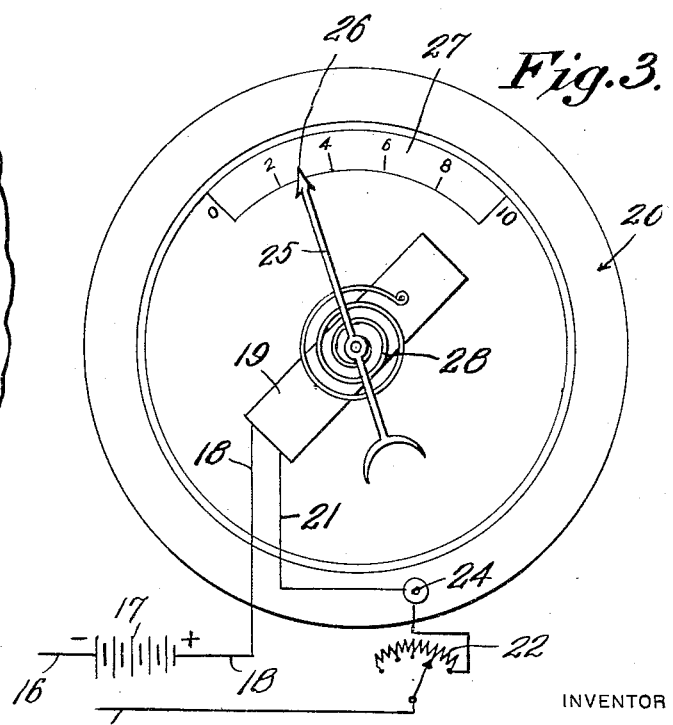
Fig. 3 is a detail of the gage.

The tank 1 is of usual construction being formed of sheet metal and provided with the filling nipple 2 having the closure cap 3 removably secured thereon. A cylindrical casing 4 is secured in the tank and extends from the top to the bottom thereof, this casing being provided at its lower end with openings 5 which communicate between the interior of the casing and the tank. A flange closure plug 6 is secured in the upper end of casing 4 and is provided with a central bore 7 which slidably receives a rod 8 which is preferably made of thin sheet metal and is hollow so as to be comparatively light. A hopper float 9 is secured to the lower end of this rod and is provided with a radially projecting finger 10 which engages into a helical guide groove 11 formed in the inner face of casing 4. As will be noted more particularly from Fig. 2, rod 8 is of rectangular cross section. This rod fits loosely through an eye 12 formed at the inner end of a metallic arm 13 which projects radially from the rod. This arm carries a brush 14 which engages the upper surface of an arcuate resistance strip 15 which is secured in the upper face of plug 6, the plug being formed of hard wood or other suitable electrical resisting material. Strip 15 is disposed concentric with rod 8 and is formed of carbon or other suitable material of relatively high electrical resistance. The helical guide groove 11 of casing 4 is so disposed that, when the float has been raised into its highest position by the liquid within the tank, the brush 14 will be positioned adjacent end 15ª of resistance strip 15. This end of the strip is connected by a lead 16 to the negative side of an electric battery 17 the positive side of which is connected by a lead 18 to one pole of a magnetic coil 19 positioned within the casing of the indicator or gage 20. The other pole of this coil is connected by a lead 21 to one pole of adjustable resistance 22 the other pole of which is connected by a lead 23 to the tank 1. A push button switch 24 is interposed in lead 21 in advance of the resistance 22. As the level of the liquid within the tank 1 falls the float 9 will be lowered and, due to the engagement of finger 10 into guide groove 11, will cause rotary movement of rod 8 in such direction as to move the brush 14 toward end 15ª of resistance strip 15 thus decreasing the resistance offered to the current, when the circuit of the battery is closed, in accordance with the level of the liquid within the tank.

A magnetic needle 25 is rotatably mounted above the center of coil 19. When the coil is energized the tendency will be to move this needle into a position at right angles with the axis of the coil. When moved into this position, the indicating point 26 of the needle will be positioned adjacent the end designated "zero" of the arcuate graduated scale 27 positioned beneath the needle and concentric with the pivotal axis thereof. This scale is graduated to indicate gallons, or any other suitable unit of measurement. The tendency of the magnetic coil 19 to move the needle 25 into "zero" position on the scale is counteracted by a spiral spring 28 which is secured to the casing containing the coil at its outer end and to the needle at its inner end, this spring exerting a torque which tends to turn the needle toward the end of the scale designated "10." It will be evident that, as the amount of current which flows through the magnetic coil 19 varies, the magnetic force exerted thereby which tends to turn the needle into "zero" position will act accordingly. In applying the apparatus, the adjustable resistance 22 is set so that, when the brush 14 is at the end 15ª of resistance strip 15 so as to permit the full current of battery 17 to flow through coil 19, the point 26 of needle 27 will be positioned at end "10" of the scale. The scale is graduated to indicate the number of gallons of fuel within the tank, it being assumed that the tank illustrated contains ten gallons when filled to such a level as to raise the float 9 into its highest position, the space between the ends of the scale being marked to indicate two, four, six, etc., gallons. Of course, if desired, the spaces between these main graduation marks may be sub-divided to indicate quarts, pints, etc. The instrument above described operates on the same principle as the simplest form of a voltmeter, the deflection of the pointer over the scale varying in accordance with the current flowing through the magnetic coil 19. As the amount of current which flows through this coil is regulated by the resistance strip 15 and the brush 14 in wiping engagement therewith, and as this brush is moved over the strip in direct accordance with the movement of float 9, it will be evident that the instrument will indicate accurately the amount of fuel within the tank at any given time. Normally, the circuit of battery 17 will be open so that no current will flow through the instrument, the needle 25 being at the "10" mark on the scale. When it is desired to ascertain the amount of fuel within the tank, the push button switch 24 is depressed so as to close the circuit of the battery, when the instrument will operate in the manner above set forth.

Of course, if desired, lead 23 may be grounded to the frame of the automobile on which the tank is mounted, the tank being also grounded to this frame instead of being connected directly to the tank. It will also be evident that there may be slight changes made in the construction and arrangement of the different parts of my invention without departing from the field and scope of the same, and I intend to include all such variations, as fall within the scope of the appended claims in this application in which a preferred form only of my invention is disclosed.

What I claim is:

1. In indicating means, a container, a float mounted within the container, said float being provided with a rod secured thereto and projecting from the top of the container, a resistance strip disposed concentric with said rod and electrically insulated from the container, a brush in engagement with said strip and movable over the same, means for causing rotary movement of the float in opposite directions as it rises and falls in accordance with variations in the level of liquid within the tank, and connections between said rod and brush for causing movement of the brush over the resistance strip in accordance with rotary movement of the rod.

2. In indicating means, a container, a cylindrical casing mounted within the container and communicating with the interior thereof at its lower end, said casing being provided in its inner face with a helical guide groove, a float mounted within the casing and having a guide finger engaging in said groove for causing rotary movement of the float in opposite directions as it rises and falls in accordance with variations in the level of liquid within the container, a plug of electrical insulating material secured in the upper end of said casing, a rod carried by the float and projecting through said plug so as to be freely rotatable therein, a resistance strip mounted in the upper face of said plug in concentric spaced relation with the rod, an arm carried by said rod, the rod being freely slidable through the arm, and a brush carried by said arm and in wiping engagement with the resistance strip.

In testimony whereof I affix my signature in presence of two witnesses.

LOUIS J. VANDERMYDE.

Witnesses:
JOHN VAN DER MYDE,
H. J. LUDENS.